Dec. 27, 1966 J. DAVIDSE ET AL 3,294,899

FREQUENCY-DIVIDING CIRCUIT ARRANGEMENT

Filed Sept. 10, 1963 2 Sheets-Sheet 1

INVENTORS
JAN DAVIDSE
BERNARDUS H.J.CORNELISSEN
BY
Frank R. Trifari
AGENT

FREQUENCY-DIVIDING CIRCUIT ARRANGEMENT

Filed Sept. 10, 1963 2 Sheets-Sheet 2

INVENTORS
JAN DAVIDSE
BERNARDUS H.J.CORNELISSEN
BY
Frank R. Trifari
AGENT 3,294,899

FREQUENCY-DIVIDING CIRCUIT ARRANGEMENT

Jan Davidse and Bernardus Henricus Jozef Cornelissen, Emmasingel, Eindhoven, Netherlands, assignors to North American Philips Company, Inc., New York, N.Y., a corporation of Delaware Filed Sept. 10, 1963, Ser. No. 307,916

Claims priority, application Netherlands, Sept. 12, 1962, 283,156

3 Claims. (Cl. 178—5.4)

The invention relates to a circuit arrangement for dividing frequencies of incoming signals the arrangement comprises a mixing stage with two input terminals, to the first of which is fed via an input channel the signal with a frequency $f_i = mf_o$ *c./s.* $(m \geqslant 3)$ which should be divided a positive feedback loop arranged between an output terminal of the mixing stage, from which output terminal a signal having a frequency of $f_o$ *c./s.* is derived, and the second input terminal, said feedback loop including a multiplying stage which multiplies the frequency $f_o$ by a factor $(m-1)$, the frequency divided signal being derived from a tapping provided in the feedback loop, a starting signal being fed via a starting channel to a point of the feedback loop.

Such a dividing circuit arrangement, which is a regenerative dividing arrangement due to the provision of the positive feedback loop, is employed inter alia in a colour television receiver, in which an indexing tube performs the function of the display tube. In such a tube the screen is composed of a number of groups of colour strips, each group comprising, for example, three phosphor strips, i.e., a red, a green and a blue strip. In order to obtain the responsive information about the colour strip struck by the scanning electron beam, the screen is furthermore provided with indexing strips, from which the indexing signal is derived.

In the receiver the subcarrier, on which the incoming colour signals are modulated, is replaced by the indexing signal, after which the modulated indexing signal is fed to a control-electrode of the indexing tube.

The starting of the dividing arrangement is strictly necessary, since, as is known, without starting the division may start in as many phases as is the value of the divided. However, by supplying the starting signal, which has a fixed phase relationship to the signal supplied via the input channel through the starting channel to a point of the feedback loop, it can be achieved that starting always occurs in the same phase. When the dividing circuit is employed in a television receiver, this starting signal can be obtained from a small number of so-called run-in indexing strips, which are provided on that side of the screen of the display tube where the horizontal scan starts.

As will be explained more fully hereinafter, no correct start can be performed owing to the filters included in the arrangement.

The input channel, the starting channel and the feedback loop comprise filters in order to separate the various desired frequencies from the undesired frequencies. Such filters have a given transit time. This involves that for one fixed frequency the above-mentioned fixed phase relationship can always be realized, if necessary by adding a fixed phase shift either in the input channel or in the starting channel. With a varying frequency, however, for example due to a variation in the speed of the electron beam in an indexing tube scanning run-in strips and indexing strips, the phase varies due to the aforesaid transit time. This may result in the phase of the starting signal varying with respect to that of the signal to be divided to an extent such that the dividing circuit leaps to a different phase. This must be avoided, since then the phase is no longer at the start.

The arrangement according to the invention has for its object to obviate this disadvantage and is characterized in that the transit time ($T_2$, $T'_2$ and $T''_2$) of the filters in the starting channel must be substantially equal to the transit time ($T_1$) of the filters in the input channel plus the total transit time $(T_3+T_4)$ of the filters in the feedback loop, said total transit time being multiplied by the ratio:

$$(f_o/mf_o)$$

between the frequency $(f_o)$ of the signal at the output terminal of the mixing stage and the frequency $(mf_o)$ to be divided and minus the transit time of the filters in that portion of the feedback loop which lies between the point of supply of the starting signal and the second input terminal of the mixing stage.

A few embodiments of circuit arrangements according to the invention will now be described by way of example with reference to the accompanying drawings, in which.

Figure 1:
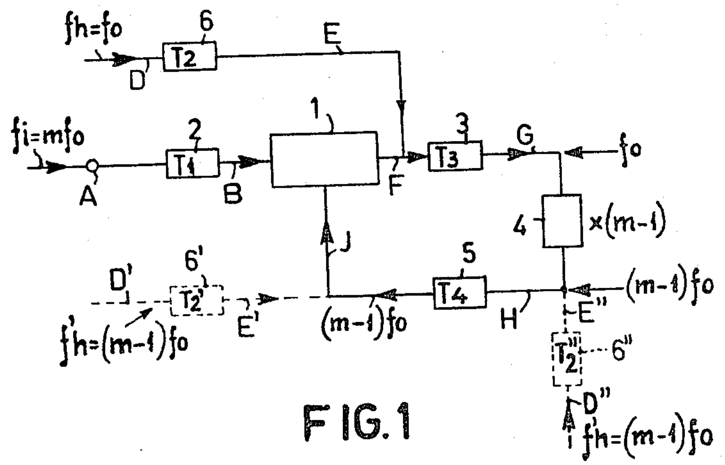
FIG. 1 shows a general block diagram of a regenerative dividing arrangement, to which the signal, the frequency of which is to be divided and the starting signal are supplied.

Referring now to FIG. 1, reference numeral 1 designates the mixing stage, to the first input terminal B of which is fed the signal to be divided, having a frequency of $f_i = mf_o$ *c./s.*, in which $m \geqslant 3$. This signal reaches the terminal B via an input channel, indicated symbolically by the block 2, representing the amplifier of said input channel. Such an amplifier 2 is provided with filters to ensure that only a signal having the frequency $f_i$ reaches the input terminal B. The overall transit time of the filters in the input channel amounts to: $T_1$ sec.

It is assumed that the second terminal J has a signal of the frequency $(m-1)f_o$; by mixing in the mixing stage 1, a signal of the frequency $f_o$ will be produced at the output terminal F, the filter in the output circuit of the mixing stage 1 being tuned to said frequency. The latter filter is indicated symbolically in FIG. 1 by the block 3; it has a transit time of $T_3$ sec. If necessary, the block 3 may comprise an additional amplifying stage and further filters, the total transit time of the filters of the block 3 being then $T_3$ sec.

The frequency $f_o$ of the signal derived from the output terminal G is multiplied in the multiplying stage 4 by a factor $(m-1)$, so that at the output terminal H of the stage 4 a signal having a frequency of $(m-1)f_o$ *c./s.* is produced. Also the output circuit of the stage 4 comprises a filter, which is tuned to the frequency $(m-1)f_o$ and has a transit time of $T_4$ sec. The latter filter is represented symbolically by the block 5. It will be obvious that, if necessary, the block 5 may also comprise an amplifying stage with the associated filters, the overall transit time of all filters in 5 being again $T_4$ sec.

Therefore, the second input terminal J of the mixing stage 1, connected to the output terminal of 5, has produced at it the supposed signal of the frequency of $(m-1)f_o$ c./s., so that, when the circulating amplification in the positive feedback loop connected between the terminals F and J is equal to 1, the regenerative dividing circuit will continue operating with a regular supply of a signal to the terminal B, and a signal of the frequency $f_o$ can be derived from the terminal G and a signal of the frequency $(m-1)f_o$ from the terminal H. In the first case the frequency $mf_o$ is divided by a factor $m$ and in the second case it is divided by a factor $m/m-1$.

As stated in the preamble, the dividing circuit must be started, since failing this, it will actually start, for example due to a switching pulse or due to noise components, in an arbitrary phase. Moreover, when the dividing circuit is employed in a colour television receiver comprising an indexing tube, the electron beam produced therein will be suppressed during the horizontal fly-back time, so that during this fly-back time no signal is fed to the terminal B.

At the beginning of the next-following horizontal deflection of the electron beam, the dividing circuit must again be started. To this end, as stated above, run-in indexing strips, the number of which is small with respect to the number of indexing strips proper, are provided in the tube, the relative distance between said strips differing from that of the indexing strips proper. The distance between the run-in indexing strips may, for example, be chosen so that the frequency $f_h$ of the signal derived from the indexing tube, when the electron beam scans the run-in indexing strips, is equal to or amounts to half of the frequency $f_s$ of the switching signal to be supplied to the Wehnelt cylinder of the indexing tube, on which signal the colour signals are modulated.

In the first case the relative distance between the run-in indexing strips is equal to the relative distance between two colour strips for the reproduction of the same colour and in the second case it is twice said distance.

It is supposed for example that $m=3$; then $f_i=3f_o$, so that in the first case $f_s=f'_h=(m-1)f_o=2f_o$ and $f_i=3/2f_s$. In the second case $f_h=1/2f_s=f_o$.

If $m=3$, the pattern of the run-in indexing strips may also be arranged as follows. In principle, the relative distance between the run-in indexing strips is rendered equal to that of the indexing strips proper, one of each group of three run-in indexing strips being omitted, however.

A Fourier analysis applied to the run-in indexing signal obtained from such a pattern shows that this run-in indexing signal comprises a component with $f_o$, a component with $2f_o$ and a component with $3f_o$. The component with $f_o$ or the component with $2f_o$ may be used for starting, at will.

Depending upon the fact whether the frequency of the starting signal $f_h=f_o$ c./s. or $f'_h=(m-1)f_o$ c./s., the starting signal must be fed to a different point of the feedback loop of the dividing circuit. It will be obvious that the starting signal must be fed to a point, where the frequency of the signal which is produced, in the operation of the dividing circuit, by the regenerative phenomenon, when the signal of the frequency $f_i$ is fed to the terminal B, is equal to the frequency of the starting signal.

If the frequency $f_h=f_o$ c./s., the starting signal can be fed to the points F and G. If $f'_h=(m-1)f_o$, it can be fed to the points H and J.

This is illustrated in FIG. 1. The starting channel, which is represented symbolically by the blocks 6, 6' and 6'', with its output terminals E, E' and E'' respectively can be connected to the points (terminals) F, G, H and J; in FIG. 1 no connection to the point G is shown.

If the introduction of phase errors must be avoided, the condition must be fulfilled that no phase difference should occur between the starting signal and the signal produced in the regenerative dividing circuit itself at the area where the starting signal is fed to the feedback loop. With the aid of this condition the relationship between the various transit times of the filters in the arrangement can be calculated as follows:

It is supposed with this calculation that the transit time of the filters in the starting channel is $T_2$ sec., $T'_2$ sec. or $T''_2$ sec., respectively, in dependence upon the place where the starting signal is supplied back to the feedback loop.

It is furthermore assumed that all transit times ($T_1$, $T_2$, $T'_2$, $T''_2$, $T_3$ and $T_4$) are constant, i.e., independent of the frequency.

With these suppositions the signals at the various points of the arrangement can be expressed as follows:

At point A, the input of the input channel, the signal has the form:

$$\cos m\omega_o t$$

wherein $$\omega_o=2\pi f_o$$

At point B, due to a delay of $T_1$ sec. in the input channel 2 a signal is produced of the form:

$$\cos\{m\omega_o(t-T_1)\}$$

If provisionally a certain phase angle $\varphi$ for the signal at point J is assumed, the signal at this point can be expressed by:

$$\cos\{(m-1)\omega_o t+\varphi\} \qquad (1)$$

A distinction is now made between the signal produced at point F due to the regenerative effect via the feedback loop and the starting signal reaching the point F via the starting channel.

The signal produced by the regenerative action at point F is designated by $F_B$ and all signals obtained thereby at points G, H and J by $G_B$, $H_B$ and $J_B$ respectively. At point $F_B$ the signal is obtained by mixing in the mixing stage 1 the signals at point B and J. Since only the difference frequency is important:

$$F_B=\cos\{\omega_o t-m\omega_o T_1-\varphi+2K\pi\}$$

with (K=0, 1, 2, 3 . . .), since without a starting signal the value of K is arbitrary.

The signal at point $F_B$ is delayed in 3, so that the signal at point G is found to be:

$$G_B=\cos\{\omega_o t-m\omega_o T_1-\varphi-\omega_o T_3+2K\pi\}$$

After multiplication in the stage 4, the signal at point H has the form:

$$H_B=\cos\{(m-1)\omega_o t-m(m-1)\omega_o T_1-(m-1)\varphi-(m-1)\omega_o T_3+(m-1)2K\pi\}$$

which, subsequent to the delay in 5, yields:

$$J_B=\cos\{(m-1)\omega_o t-m(m-1)\omega_o T_1-(m-1)\varphi-(m-1)\omega_o(T_3+T_4)+(m-1)2K\pi\} \qquad (2)$$

As a matter of course, the signal at point J cannot have two different phases and it follows therefrom that the signal indicated by the Equation 2 must have the same phase as the assumed signal, characterized by Equation 1. It follows therefrom:

$$\varphi=-m(m-1)\omega_o T_1-(m-1)\varphi-(m-1)\omega_o(T_3+T_4)+(m-1)2K\pi$$

or $$\varphi=-m\omega_o T_1-\left(\frac{m-1}{m}\right)\omega_o(T_3+T_4)+\left(\frac{m-1}{m}\right)2K\pi$$

Introducing this value of $\varphi$ into the preceding equations, we obtain:

$$\cos\left[\omega_o t-\omega_o T_1+\frac{m-1}{m}\omega_o(T_3+T_4)+\frac{1}{m}2K\pi\right] \qquad (3)$$

$$G_B=\cos\left[\omega_o t-\omega_o T_1-\frac{1}{m}\omega_o T_3=\frac{m-1}{m}\omega_o T_4+\frac{1}{m}2K\pi\right] \qquad (4)$$

$$H_B=\cos\left[(m-1)\omega_o t-(m-1)\omega_o T_1-\frac{m-1}{m}\omega_o T_3+\frac{(m-1)^2}{m}\omega_o T_4+\frac{m-1}{m}2K\pi\right] \qquad (5)$$

$$J_B=\cos\left[(m-1)\omega_o t-(m-1)\omega_o T_1-\frac{m-1}{m}\omega_o(T_3+T_4)+\frac{m-1}{m}2K\pi\right] \qquad (6)$$

It must then be found what forms the signals at the points E, E′ and E″ respectively have, when the starting signal is fed to the points F, H and J via the starting channels 6, 6′ and 6″ respectively.

At the input terminal D of the starting channel 6 the signal has the form:

$$\cos \omega_o t$$

After the delay in 6, the signal at terminal E is:

$$\cos (\omega_o T - \omega_o T_2) \qquad (7)$$

Since point E is connected to point F, the phase of the signal given by Equation 3 must be equal to that of the signal characterized by Equation 7, so that:

$$\omega_o T_2 = -\omega_o T_1 + \frac{m-1}{m}\omega_o (T_3+T_4) + \frac{1}{m}2K\pi \qquad (8)$$

wherein K may have the values 0, 1, 2, 3 . . . $(m-1)$. The dividing circuit starts at that phase of the $m$ possible output phases, which is closest to the phase of the starting signal. When the phase relationship between a starting signal and the signal fed to terminal B does not vary, the dividing circuit will always start in the same phase, or in other words, with a fixed value of $\omega_o$, the Equation 8 can always be fulfilled, which means that at each start K has the same value. If necessary, if the right-hand and the left-hand terms of Equation 8 are not equal to each other, the introduction of a fixed phase shift, either in the input channel 2 or in the starting channel 6, can provide this equality.

Figure 4:
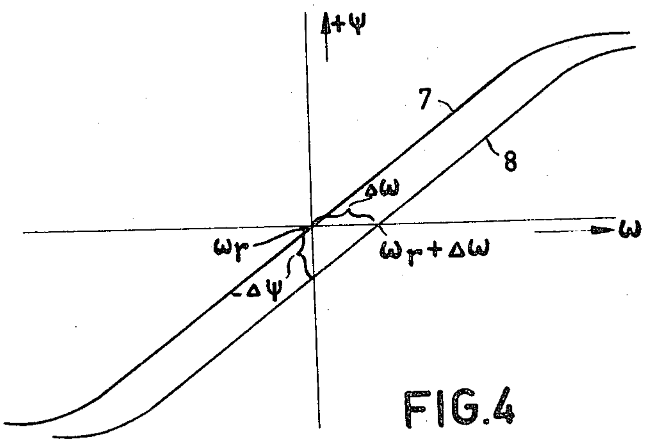
FIG. 4 shows the phase characteristic curve of a wide band filter.

The said constant phase shift can be obtained in a very simple manner by means of a wide-band circuit, i.e., a circuit having a comparatively poor quality factor Q, which is not tuned to its resonance frequency $f_r$ but which is tuned to a frequency $f_r + \Delta f$. This is illustrated in FIG. 4, in which the curve 7 represents the phase $\varphi$ of a wide-band circuit as a function of the angular frequency $\omega = 2\pi f$, when said circuit is tuned to its resonance frequency $f_r$. The curve 8 illustrates this phase relationship when the circuit is tuned to the frequency $f_r + \Delta f$. With the angular frequency $\omega_r$, which may be equal to a given fixed angular frequency $\omega_o$, a given fixed phase shift $-\Delta\varphi$ will occur. If the angular frequency $\omega$ varies, the resultant phase variation will have the same value, if tuning, is performed either to the frequency $f_r$ or to the frequency $f_r + \Delta f$, due to the substantially linear course of the curves 7 and 8 for a large region around the angular frequency $\omega_r$. Since the transit time T of a circuit is defined by: $T = d\varphi / d\omega$, it will be seen that the transit time remains the same for the curves 7 and 8. It will furthermore be obvious that the poorer the quality factor Q, the slighter is the slope of the curves 7 and 8 and hence the shorter is the transit time T.

With a fixed angular frequency $\omega_o = \omega_r$ the assembly can therefore be arranged so that the Equation 8 is fulfilled.

However, if the frequency is varied, this is no longer true. By the adjustment of a fixed phase shift, the Equation 8 can be fulfilled but as soon as the frequency varies to a sufficient extent, the dividing circuit leaps to a different phase, so that the start does not take place in the correct phase. This may be accounted for as follows: it being assumed, for example, that $\omega_o$ varies by an amount $\Delta\omega_o$, it can be written for the Equation 8:

$$(\omega_o + \Delta\omega_o) T_2 = (\omega_o + \Delta_o)\left[T_1 - \frac{m-1}{m}(T_3+T_4)\right] - \frac{1}{m}2K\pi$$

This equation may be split up into an equation:

$$\omega_o T_2 = \omega_o T_1 - \frac{m-1}{m}\omega_o (T_3+T_4) - \frac{1}{m}2K\pi \qquad (9)$$

and an equation:

$$\left[T_1 - \frac{m-1}{m}(T_3+T_4)\right] \qquad (10a)$$

If for the fixed angular frequency $\omega_0$ the Equation 9 is fulfilled, it will appear that by varying the frequency an additional phase shift indicated by the Equation 10$a$ is added to the whole, which implies the possibility that the phase would change, which must be avoided. The solution consists in that both the condition of the Equation 9 if fulfilled by the adjustment of an additional phase shift, if necessary, and that of the Equation 10$a$ is fulfilled. The latter equation can be fulfilled by choosing the transit time in accordance with the equation:

$$T_2 = T_1 - \frac{m-1}{m}(T_3+T_4) \qquad (10)$$

A consideration of the Equations 9 and 10 shows that for the value $K=0$ no additional phase shift need be introduced, since in this case the fulfillment of Equation 10 fulfills automatically the Equation 9.

For $K \neq 0$, the Equation 9 can be fulfilled, when the Equation 10 applies, by introducing an additional phase shift. This fixed phase shift need never exceed $2\pi/m$, since the start can always be caused to lead to a different phase with this phase displacement.

The law for the choice of the transit times can be readily formulated, since the transit time $T_2$ should be equal to the transit time $T_1$ plus the transit time $(T_3+T_4)$, multiplied by the ratio $(f_o/mf_o)$ between the frequency $(f_o)$ of the signal at the terminal F and the frequency $(mf_o)$ of the signal to be divided at the terminal B, and minus the transit time $(T_3+T_4)$ in the portion of the feedback loop between the point F, to which the starting signal is fed, and the second input terminal J. This rule in the form of a formula provides:

$$T_2 = T_1 = \frac{f_o}{mf_o}(T_3+T_4) - (T_3+T_4) = T_1 - \frac{m-1}{m}(T_3+T_4)$$

which is the same equation as the Equation 10 found above.

Also when the starting signal is fed to a point differing from the point F, the aforesaid rule applies.

If, for example E′ of the starting channel 6′ is connected to the terminal J, the phase of the starting signal at point E′ must be the same as that of the signal given by the Equation 6.

The signal at point E′ has the shape:

$E' = \cos (m-1)\omega_o(t - T'_2)$, so that it must be true that:

$$(m-1)\omega_o T'_2 = -(m-1)\omega_o T_1 - \frac{m-1}{m}\omega_o (T_3+T_4) + \frac{m-1}{1}2K\pi$$

In a manner similar to that for the Equation 8, it can be derived that:

$$T'_2 = T_1 + \frac{1}{m}(T_3+T_4) \qquad (11)$$

Since the starting signal is directly fed to point J, the transit time of the feedback loop between the point to which the starting signal is applied and the second input terminal J is equal to zero. It will therefore be seen that the Equation 11 fulfills the aforesaid law.

The same can be proved for the point E″, since the waveform of the signal at this point is equal to:

$$\cos (m-1)\omega_o(t - T''_2)$$

The phase of this signal must be the same as that of the signal at point $H_B$, so that it must apply that:

$$(m-1)\omega_o T''_2 = -(m-1)\omega_o T_1 - \frac{m-1}{m}\omega_o T_3 + \frac{(m-1)^2}{m}\omega_o T_4 + \frac{m-1}{m}2K\pi$$

from which it can be derived that:

$$T''_2 = T_1 + \frac{1}{m}T_3 - \left(\frac{m-1}{m}\right)T_4 \qquad (12)$$

According to the rule given above it must apply that:

$$T''_2 = T_1 + \frac{f_o}{mf_o}(T_3+T_4) - T_4 = T_1 + \frac{1}{m}T_3 - \frac{m-1}{m}T_4$$

which is again the Equation 12.

It will be obvious that the same can be proved for point G.

With the above considerations it is always supposed, for the sake of simplicity, that the transit time $T=d\varphi/d\omega$, which may be considered to be constant for the range used (linear phase characteristic curve), which means that the transit times are independent of the frequency. If this is not the case (non-linear phase characteristic curve for the working range), the considerations remain the same, but the various phase characteristic curves of all circuits in the dividing arrangement, in the starting channel and in the input channel must be adapted to each other. The simplest solution consists in that all circuits are given substantially linear phase characteristic curves, which is illustrated in FIG. 4.

Figure 2:
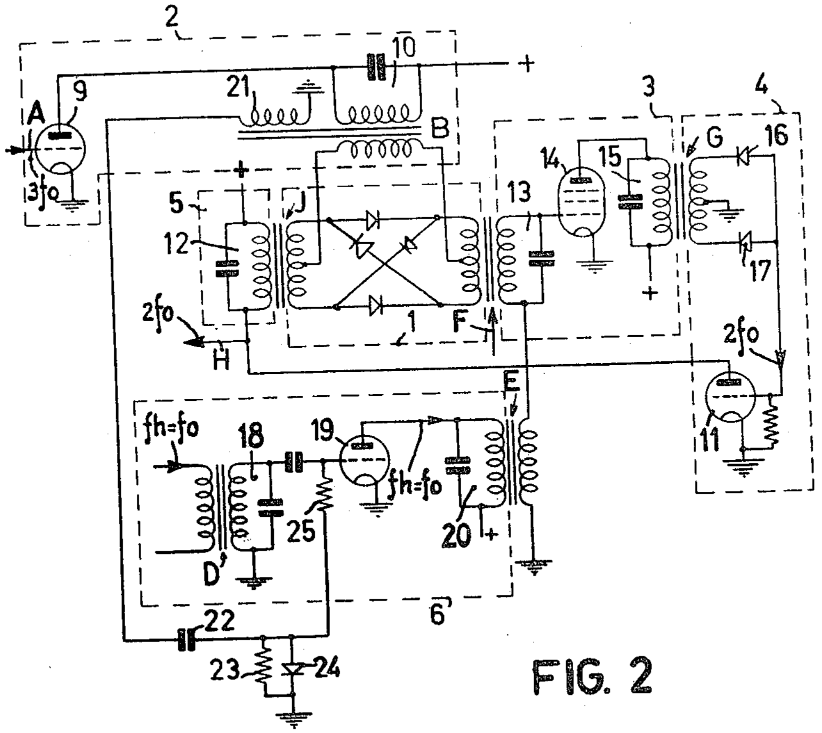
FIG. 2 is a detail diagram of the dividing arrangement of FIG. 1, in which the starting signal is directly fed to the feedback loop in the output circuit of the mixing stage.

FIG. 2 shows in detail the block diagram of FIG. 1 for the case in which $m=3$ and the starting signal is fed to point F. The signal of the frequency $3f_o$ to be divided is fed via the input terminal A, i.e., the control-grid of the amplifying valve 9 and the circuit 10, tuned to the frequency $3f_o$, to the first input terminal B of the mixing stage 1. The control-grid of the valve 11 receives a signal of the frequency $2f_o$, which reaches the second input terminal J via said valve and the circuit 12, tuned to the frequency $2f_o$.

After mixing in the mixing stage 1, a signal of the frequency $f_o$ is produced at the terminal F, which signal is fed via the circuit 13, tuned to the frequency $f_o$, via the amplifying valve 14 and the circuit 15, also tuned to the frequency $f_o$, to the multiplying stage 4.

This multiplying stage comprises inter alia the diodes 16 and 17, which provide a multiplication by the factor $(m-1)=2$, so that again the signal of the frequency $2f_o$ is obtained for supply to the control-grid of the valve 11.

The starting signal of the frequency $f_h=f_o$ is fed via the circuit 18, the valve 19 and the circuit 20 to the point E.

From a comparison of the FIGS. 1 and 2 it follows that the circuit 10, if necessary together with circuits provided before the valve 9, determines the transit time $T_1$ of the input channel. The circuits 18 and 20, also together with any circuits provided before them, determine the transit time $T_2$, the circuits 13 and 15 the transit time $T_3$ and the circuit 12 the transit time $T_4$.

Figure 3:
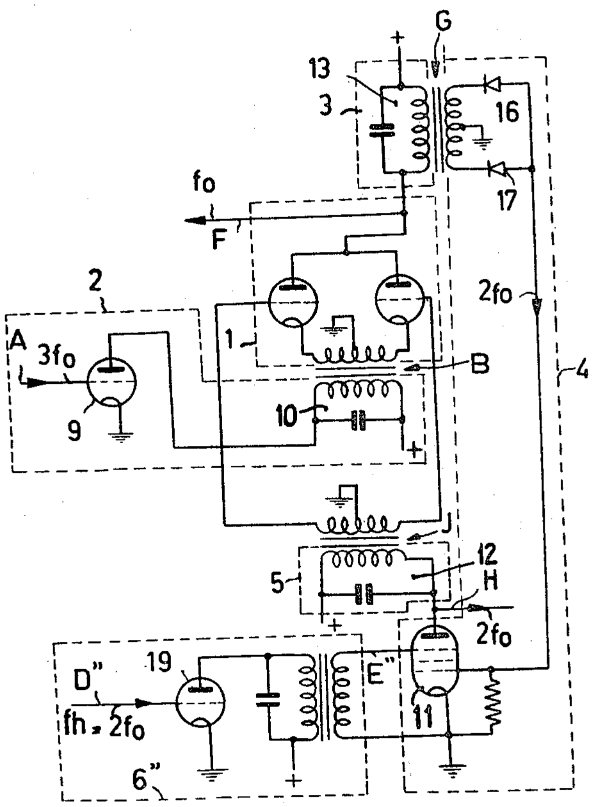
FIG. 3 is a detail diagram of the dividing arrangement of FIG. 1, in which the starting signal is supplied to an arbitrary point of the feedback loop

A further embodiment for $m=3$ is illustrated in FIG. 3, where the starting signal of the frequency $(m-1)f_o=2f_o$ is fed to point H. After the foregoing the operation of the arrangement shown in FIG. 3 will not need further explanation.

A consideration of the Equations 10, 11 and 12 leads to the following recognition:

From Equation 10 it appears for example that $T_1>T_2$. Now $T_2$ is the transit time of the starting channel and $T_1$ is the transit time of the input channel. If the run-in pattern does not supply a signal of the frequency $f_1$, which may be desirable under certain conditions, the signal of the frequency $f_1$ will not be produced until the indexing pattern proper is scanned. From this instant however, the starting signal with the frequency $f_o$ is no longer supplied. Suppose the scanning of the indexing pattern proper starts at the instant $T_0$, the last instant when the starting frequency of the frequency $f_o$ is still available at point F, will be the instant $T_0+T_2$. The starting signal reaches, subsequent to multiplication, the point J at the instant $T_0+T_2+T_3+T_4$.

The signal with the frequency $f_1$ is available at point B at the earliest at the instant $$T_0+T_1=T_0+T_2+(m-1/m)(T_3+T_4)$$

The time during which the two signals are available for mixing purposes, is therefore the difference between the two aforesaid times and thus equal to: $1/m(T_3+T_4)$ sec. The first signal produced by mixing, however, requires $(T_3+T_4)$ for reaching the point J from point F. Thus during a period of time of $(m-1/m)(T_3+T_4)$ sec., i.e., the difference in time between the instant when the last signal derived from the starting signal is available at point J and the first instant when the signal produced by mixing arrives again at point J, no signal at point J is available.

This is repeated so that always for a time of $1/m(T_3+T_4)$ sec. both a signal of the frequency $f_1$ at point B and a signal of the frequency $(m-1)f_o$ at point J are available, after which an interval of $$(m-1/m)(T_3+T_4)$$

sec. occurs, in which only a signal at point B is available. Under these conditions there is, of course, no correct start.

If the starting signal is not fed to point F, but for instance to point J, the situation remains exactly the same, since also in this case the last instant when the starting signal is available at point J coincides with the instant $T_0+T_2'=T_0+T_1+1/m(T_3+T_4)$, if for $T_2'$ the value given by the Equation 11 is filled in.

The first instant when the signal of the frequency $f_1$ becomes available at point B is $T_0+T_1$. Also now the signals at points B and J are simultaneously available only for $1/m(T_3+T_4)$ sec., whereas also the first signal produced by mixing appears at the terminal J after $(T_3+T_4)$ sec. Also in this case a time interval of $$(m-1)/m(T_3+T_4)$$

sec. is found during which no signal is available at point J.

In a similar manner it can be proved that the same drawback applies when the starting signal is fed to points H or G.

A first possibility to obviate the drawback of the unequal transit times consists in that the run-in pattern is caused to supply both the starting signal of the frequency $f_o$ or of the frequency $(m-1)f_o$ and a signal of the frequency $f_1=mf_o$. Since the scanning of the run-in pattern takes more time than the interval of $(T_3+T_4)$ sec., the signals will be available at points J and B for a sufficient time simultaneously to guarantee a correct start even in the case of unequal transit times $T_1$ and $T_2$ (or $T_2'$ and $T_2''$). This can be achieved when, as mentioned above, in the run-in pattern each third strip is omitted. When the electron beam scans such a run-in pattern, one obtains a signal which contains the frequencies $f_o$, $2f_o$ and $3f_o$ if $f_1=3f_o$ is the frequency of the indexing signal. So one can use the frequency $f_o$ if the starting signal is applied to points F or G via filters which let only the frequency through. If the frequency $2f_o$ is used, then the starting signal should be applied to the points H or J via filters which let only the frequency $2f_o$ through. The signal is also applied to point A and because block 2 only lets frequency $f_1=3f_o$ through to point B, the desired result is obtained.

As stated above it may be undesirable under certain conditions that the run-in pattern should supply, in addition, a signal of the frequency $f_1$. If the total transit time from the input of the arrangement, where the signal of the frequency $f_1$ is obtained, to the control-electrode of the indexing tube is very short, it is possible that the switching signal of the frequency $f_s$ should already be available at the said control-electrode before the starting channel is switched off after the dividing arrangement has started.

After the foregoing it will be apparent that the starting channel cannot be switched off too soon, since otherwise the signals at points J and B are not available simultaneously for a sufficiently long time.

The signal of the frequency $f_s$ can then be mixed with the signal of the frequency $f_1$, which is also supplied by the run-in pattern, so that by mixing, in the index tube itself, again a signal of the frequency $f_o$ can be produced. If, for example, $f_1=mf_o$ and $f_s=(m-1)f_o$, $f_1-f_s=f_o$.

The signal of the frequency $f_o$ obtained by mixing in the index tube must be considered undesirable with respect to the signal of the frequency $f_o$, which is directly derived from the run-in pattern. This undesirable signal is capable of setting the dividing arrangement in a different phase, which is to be avoided.

Therefore, if it is desired to make a run-in pattern, which does not supply simultaneously the frequency $f_0$ and the frequency $f_1$, whereas it should be ensured that the signals at points J and B are available during the start simultaneously for a sufficiently long time, the last tuned circuit of the starting channel may be constructed so that it delivers a prolonged starting signal by damped oscillation, after the scan of the run-in pattern has terminated.

In this case the part of the starting channel in front of its last tuned circuit must be blocked, approximately from the instant the scan of the indexing pattern starts, since otherwise again an undesirable signal of the frequency $f_0$ produced by mixing might pass, but the last circuit can deliver said prolonged starting signal for a time of about $(m-1)/m(T_3+T_4)$ sec.

The foregoing may be explained with reference to FIG. 2. As stated above, the total transit time of the tuned circuits in the starting channel 6 must be equal to $T_2$ sec. The last circuit 20 must be the circuit for the posterior supply and must therefore have a satisfactory quality Q. A satisfactory quality Q, however, involves a long transit time. The transit time of the circuit 18 and of any preceding circuits must therefore be so short that together with the transit time of the circuit 20 it is again equal to $T_2$ sec. The circuit 18 must therefore be a wide-band circuit small (Q), whereas the circuit 20 must be a narrow-band circuit large (Q). The valve 19 operates at the same time as a gate circuit for the starting channel. As soon as a signal of the frequency $3f_0$ becomes available at point B, it is supplied via the winding 21, the capacitor 22 and the resistor 23 to the diode 24, which rectifies this signal. The rectified negative voltage is fed via the grid resistor 25 to the control-grid of the valve 19.

By choosing a short RC-time of the network 22, 23 it can be ensured that the valve 19 is cut off sufficiently soon after the scan of the run-in pattern has finished and the scan of the indexing pattern starts, the signal of the frequency $f_1=3f_0$ being then produced. If desired, the capacitor 22 could be connected to the anode of the valve 9, if it is desired to cut off the starting channel sooner.

After the valve 19 has been blocked, the circuit 20 is capable of delivering a damped oscillation, so that it can provide the desired posterior supply. If desired the posterior supply could be provided by a plurality of circuits or filters in the starting channel between the gate circuit 19 and the point F.

Although in the foregoing the dividing arrangement is described for use in a colour television receiver, it may also be employed in plan-position indicator radar apparatus for fixing the instants when the pulses for writing the space circles must occur during each axial scan of the electron beam. If the frequency of these pulses is an odd multiple of the frequency of the signal providing the axial scan, the frequency of the scanning signal may be multiplied and subsequently divided in a dividing arrangement in order to obtain the desired frequency of the pulse signal. Since the instants when pulses occur must be fixed each time with respect to the instant of transmission of the transmitting pulse, the dividing arrangement must be started in the correct phase at the instant when the transmitting pulse is transmitted.

What is claimed is:

1. A frequency divider circuit comprising a source of first signals to be divided, a mixing circuit having first and second input terminals, first channel means for applying said first signals to said first terminal, a positive feedback loop circuit connected between the output of said mixing circuit and said second terminal, said feedback loop circuit comprising means for multiplying signals at the output of said mixer circuit by a factor $m-1$ whereby said signals at said output of said mixer circuit have a frequency $1/m$ times the frequency of said first signals, a source of starting signals of a frequency equal to the frequency of signals at a predetermined point in said loop circuit, and starting channel means for applying said starting signals to said point, the transit time of said starting channel being substantially equal to the transit time of said first channel, plus the total transit time of said loop circuit divided by $m$, and minus the transit time of the position of said feedback loop circuit between said point and said second terminal.

2. A frequency divider circuit comprising a source of intermittently occurring first signals to be divided, a mixing circuit, an input channel having a transit time $T_1$ for applying said first signals to one input of said mixing circuit, a positive feedback loop connected between the output and another input of said mixing circuit, said feedback loop comprising frequency multiplying means for multiplying signals at the output of said mixing means by a factor $m-1$, whereby said signals at the output of said mixing means have a frequency $1/m$ times the frequency of said first signals, said feedback loop having a transit time $T_3$ between the output of said mixing means and a predetermined point on said loop, and a transit time $T_4$ between said point and said another input of said mixing means, a source of starting signals of the frequency of signals at said point for starting the division by said divider circuit in a desired phase, and starting channel means for applying said starting signals to said point, said starting channel having a transit time $T_2$ determined substantially by the expression:

$$T_2=T_1+\frac{T_3+T_4}{m}-T_4$$

3. The frequency divider circuit of claim 2 in which said starting channel means comprises wide-band filter means, gate means, and narrow-band filter means, in the order named, between said source of starting signals and said point, and means responsive to the occurrence of said first signals connected to said gate means for preventing application of said starting signals to said point during the occurrence of said first signals.

References Cited by the Examiner

UNITED STATES PATENTS

| | | | |
|---|---|---|---|
| 2,945,087 | 7/1960 | Graham et al. | 178—5.4 |
| 3,201,510 | 8/1965 | Davidse | 178—5.4 |

OTHER REFERENCES

Nonlinear and Parametric Phenomena in Radio Engineering, A. A. Kharkevich, May 1962, John F. Rider, Publisher, Inc., pp. 180–183.

DAVID G. REDINBAUGH, *Primary Examiner.*

J. H. SCOTT, J. A. O'BRIEN, *Assistant Examiners.*